United States Patent
Qu et al.

(10) Patent No.: US 12,196,456 B2
(45) Date of Patent: Jan. 14, 2025

(54) CYCLICAL SALINITY-GRADIENT POWER GENERATING SYSTEM AND METHOD BASED ON PHASE CHANGE MATERIALS AND SOLAR PHOTOTHERMAL CONVERSION

(71) Applicant: Xi'an Jiaotong University, Xi'an (CN)

(72) Inventors: Zhiguo Qu, Xi'an (CN); Jiaqi Pu, Xi'an (CN); Zhiyuan Jiang, Xi'an (CN); Jianfei Zhang, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 342 days.

(21) Appl. No.: 17/849,270

(22) Filed: Jun. 24, 2022

(65) Prior Publication Data
US 2023/0175740 A1    Jun. 8, 2023

(30) Foreign Application Priority Data
Dec. 7, 2021    (CN) .......................... 202111487474.X

(51) Int. Cl.
| | |
|---|---|
| *F24S 60/10* | (2018.01) |
| *F24S 10/30* | (2018.01) |
| *F24S 10/80* | (2018.01) |
| *F24S 20/70* | (2018.01) |
| *H01M 8/00* | (2016.01) |

(Continued)

(52) U.S. Cl.
CPC ............... *F24S 60/10* (2018.05); *F24S 10/30* (2018.05); *F24S 10/80* (2018.05); *F24S 20/70* (2018.05); *H01M 8/00* (2013.01); *F24S 70/225* (2018.05); *F24S 80/50* (2018.05); *Y02E 10/40* (2013.01)

(58) Field of Classification Search
CPC .. F24S 60/10; F24S 10/30; F24S 10/80; F24S 20/70; H01M 8/00; Y02E 10/40; Y02E 60/14; Y02E 70/30; C09K 5/063; Y02B 10/20
See application file for complete search history.

(56) References Cited

U.S. PATENT DOCUMENTS

| | | | | |
|---|---|---|---|---|
| 3,119,723 A | * | 1/1964 | Crouthamel | .......... H01M 8/182 |
| | | | | 429/400 |
| 3,338,749 A | * | 8/1967 | Johnson | ................ H01M 8/182 |
| | | | | 429/409 |

(Continued)

FOREIGN PATENT DOCUMENTS

| | | | | |
|---|---|---|---|---|
| CN | 106953352 A | * | 7/2017 | |
| WO | WO-2013041086 A1 | * | 3/2013 | ............. C25B 1/003 |

*Primary Examiner* — Wesley G Harris
(74) *Attorney, Agent, or Firm* — WC&F IP

(57) ABSTRACT

A cyclical salinity-gradient power generating system based on phase change materials and solar photothermal conversion is provided. The system comprises a solution supplying device, a power generating device and a power output device. The solution supplying device provides seawater with high and low concentration as salinity-gradient energy source of the power generating device; the power generating device implements day-and-night cyclical salinity-gradient power generation; the power output device stores electricity, part of which is used as providing power for the pumps inside the system and part of which is used as system output. A cyclical salinity-gradient power generating method based on phase change materials and solar photothermal conversion is also provided.

10 Claims, 3 Drawing Sheets

(51) Int. Cl.
 *F24S 70/225* (2018.01)
 *F24S 80/50* (2018.01)

(56) References Cited

U.S. PATENT DOCUMENTS

| | | | | |
|---|---|---|---|---|
| 3,374,120 | A * | 3/1968 | Lawson | H01M 8/182 |
| | | | | 429/513 |
| 4,586,334 | A * | 5/1986 | Nilsson, Sr. | F02G 1/043 |
| | | | | 60/659 |
| 2006/0141346 | A1 * | 6/2006 | Gordon | H01M 6/36 |
| | | | | 429/321 |
| 2010/0092813 | A1 * | 4/2010 | Sahu | H01M 8/0432 |
| | | | | 429/409 |
| 2011/0083436 | A1 * | 4/2011 | White | F01K 3/08 |
| | | | | 165/104.19 |
| 2015/0048777 | A1 * | 2/2015 | Goldstein | H02J 7/0042 |
| | | | | 429/70 |

* cited by examiner

CYCLICAL SALINITY-GRADIENT POWER GENERATING SYSTEM AND METHOD BASED ON PHASE CHANGE MATERIALS AND SOLAR PHOTOTHERMAL CONVERSION

CROSS REFERENCE TO RELATED APPLICATION

This application claims the priority of Chinese Patent Application No. 202111487474. X, entitled "Cyclical Salinity-gradient Power Generating System and Method based on Phase Change Materials and Solar Photothermal Conversion" filed with the China National Intellectual Property Administration on Dec. 7, 2021, which is incorporated herein by reference in its entirety.

TECHNICAL FIELD

The present disclosure relates to the technical field of power generation, and in particular to a cyclical salinity-gradient power generating system and method based on phase change materials and solar photothermal conversion.

BACKGROUND ART

As a clean, cheap and renewable energy, solar energy has the advantages of wide distribution, high energy density, large storage capacity and so on, and is used mainly by photothermal conversion, photovoltaic conversion and photochemical conversion. Near the ocean, solar photothermal conversion is widely applied in the field of seawater desalination. Moreover, chemical potential gradient between seawater and fresh water contains huge amounts of energy, and a power generation method using mixture of seawater and fresh water is known as 'blue energy'. When the seawater and the fresh water with different concentrations are separated by ion selective nanoporous membrane, ions migrate directionally, so that a closed circuit is formed among electrodes and external circuit, and the salinity gradient energy is converted into electricity. On the other hand, phase change materials (PCMs) are widely used in the fields of heat storage, energy-conserving and temperature control, due to the properties of large latent heat, good temperature uniformity, phase change reversibility and so on.

Conventional technologies of salinity-gradient power generation have developed rapidly in recent years and mainly focus on material and structure design of ion selective nanoporous membrane as well as structure design of power generating devices, such that power generation efficiency and power density thereof are improved. Further, it has been put forward a solar-synergized salinity-gradient power generation method. However, regardless of one-dimensional (1-D), two-dimensional (2-D), or three-dimensional (3-D) structure, ion selective nanoporous membranes do improve the power density of an osmotic energy conversion system, but greatly increase the cost of the system, and have problems in aspect of endurance and others, which is not favorable to engineering applications. On the other hand, the conventional solar-synergized salinity-gradient power generating devices and systems cannot continuously operate in dark or rainy days due to intermittency and instability of sunshine. Therefore, it's desired to propose a stable, efficient and continuous salinity-gradient power generating device and method.

The above information disclosed in the background art is only for enhancement of understanding of the background of the present disclosure, and therefore it may contain information that does not form the prior art well known to those of ordinary skills in the art.

SUMMARY OF THE INVENTION

In view of the above issues, an object of the present disclosure is to provide a cyclical salinity-gradient power generating system and method based on phase change materials and solar photothermal conversion, which can realize continuous synergy for salinity-gradient power generation and day-and-night cyclical power generating by using photothermal effect of solar energy and heat storage and release characteristics of PCMs, thus improving the power density of the whole system.

The object of the present disclosure is achieved by the following technical solution.

A cyclical salinity-gradient power generating system based on phase change materials and solar photothermal conversion, including:

a power generating device including a first chamber storing high concentration solution, a second chamber storing low concentration solution and an ion selective nanoporous membrane arranged in between, where cations in the first chamber are driven by a concentration gradient to directionally migrate into the second chamber through the ion selective nanoporous membrane, to form an ionic flux; meanwhile a first electrode is arranged in the first chamber and a second electrode is arranged in the second chamber, where electrons migrate from the first electrode to the second electrode via an external circuit;

a phase change material (PCM) chamber arranged outside the first chamber and the second chamber, and provided with phase change materials therein, where the phase change materials repeatedly undergo phase changing accompanied with heat storage and release, to provide heat for the first chamber and the second chamber, thereby maintaining a directional migration rate of the cations, to implement cyclical power generation;

Preferably, a first photothermal conversion structure is arranged in the first chamber and a second photothermal conversion structure is arranged in the second chamber, and the first photothermal conversion structure and the second photothermal conversion structure are configured to convert the solar energy into heat.

Preferably, a first heat conductive porous structure is arranged in the first chamber and a second heat conductive porous structure is arranged in the second chamber, further, the first heat conductive porous structure is configured to conduct heat to the first chamber and the second heat conductive porous structure is configured to conduct heat to the second chamber, so as to improve the absolute temperature of the high concentration solution in the first chamber and the low concentration solution in the second chamber.

Preferably, a high light-transparent heat-insulation layer is arranged on the PCM chamber.

Preferably, the PCMs are composite phase change materials.

Preferably, the system also includes a solution supplying device which includes a first solution storage tank providing the high concentration solution to the first chamber and a second solution storage tank providing the low concentration solution to the second chamber;

Preferably, an optical collector is arranged on the first solution storage tank.

Preferably, each of the first electrode and the second electrode is an Argentum (Ag)/Silver chloride (AgCl) electrode.

Preferably, the system further includes a power output device, which includes a storage battery and power transmission components.

According to another aspect of the present disclosure, a method performed by cyclical salinity-gradient power generating based on phase change materials and solar photothermal conversion is proposed, which includes the following steps.

S1: driving, by the concentration gradient between the high concentration solution in the first chamber and the low concentration solution in the second chamber, cations in the first chamber to directionally migrate into the second chamber through ion selective nanoporous membrane, to form the ionic flux, and migrating electrons from the first electrode to the second electrode via an external circuit to form currents and in turn generate power.

S2: converting, by the first photothermal conversion structure and the second photothermal conversion structure, solar energy into heat, and conducting by the first photothermal conductive porous structure and the second photothermal conductive structure, the heat to the first chamber and the second chamber, respectively, to improve absolute temperatures of the high concentration solution and the low concentration solution, thus increasing the directional migration rate of the cations.

S3: causing phase change materials in the PCM chamber to undergo a phase change process to store the heat under an action of solar energy, and undergo another phase changing to release the heat, to maintain the directional migration rate of the cations in case of a lack of solar energy.

Compared with the prior art, the present disclosure has the following beneficial effects.

Firstly, based on the solar photothermal conversion, the heat storage of composite phase change materials, and the ion selectivity of ion selective nanoporous membrane, the present disclosure can realize an efficient, continuous, and cyclical power output.

Secondly, combining the utilization of solar photothermal conversion and heat storage of composite phase change materials, the invention implements cheap, continuous and, day-and-night cyclical power output synergy.

Thirdly, the system according to the present disclosure can stably and continuously output an electric energy with the high power density without changing the ion selective nanoporous membrane and increasing the cost, and thus has remarkable social and economic benefits, and can be widely used in the field of salinity gradient energy power generation.

Figure 1:
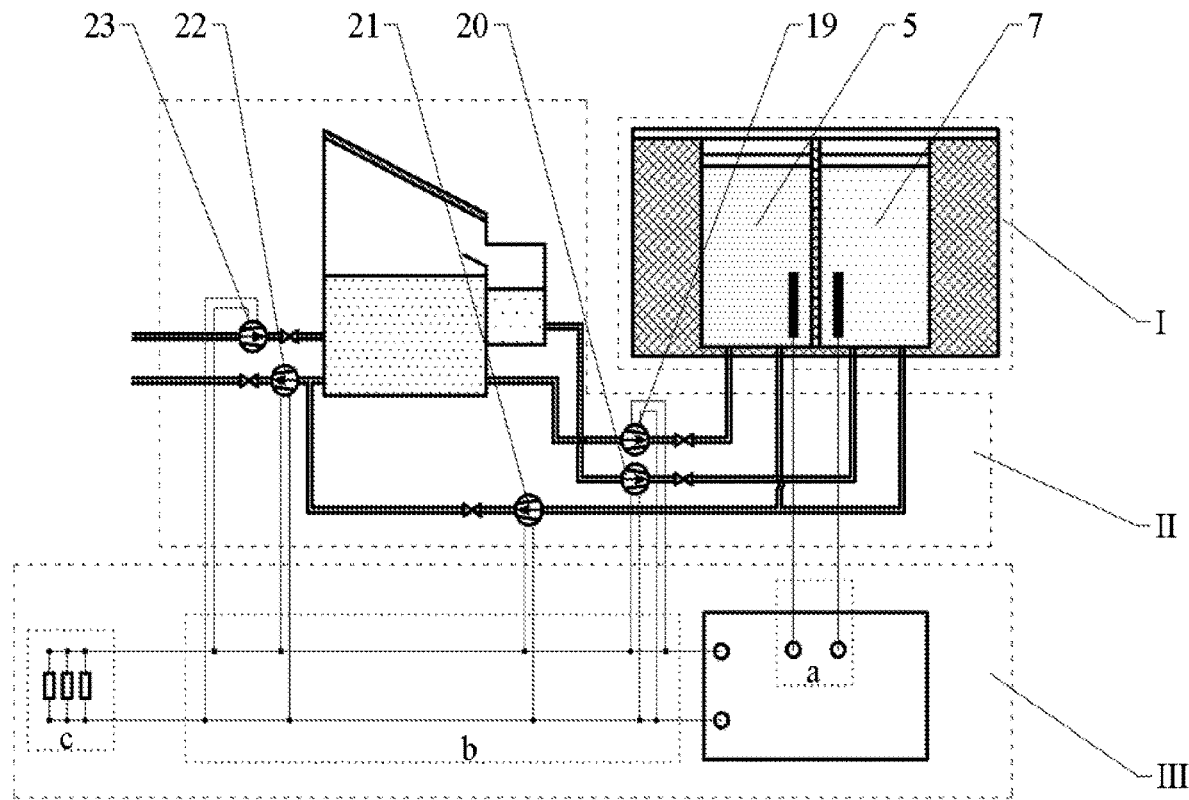
FIG. 1 is a schematic structural diagram of a cyclical salinity-gradient power generating system based on phase change materials and solar photothermal conversion according to an embodiment of the present disclosure.

DESCRIPTION OF THE REFERENCE NUMBERS OF THE DRAWINGS 1. first solution storage tank; 2. optical collector; 3. second solution storage tank; 4. high transmittance heat-insulation layer; 5. first chamber; 6. ion selective nanoporous membrane; 7. second chamber; 8. PCM chamber; 9-1. first photothermal conversion structure; 9-2. second photothermal conversion structure; 10-1. first heat conductive porous structure; 10-2. second heat conductive porous structure; 11. second electrode; 12. external circuit; 13. first electrode; 14. second inlet valve; 15. first inlet valve; 16. outlet valve; 17. main inlet valve; 18. main outlet valve; 19. first inlet pump; 20. second inlet pump; 21. outlet pump; 22. main outlet pump; 23. main inlet pump.

DETAILED DESCRIPTION OF THE EMBODIMENTS

Specific embodiments of the present disclosure will be described in more detail below with reference to drawings. Although specific embodiments of the present disclosure are shown in the drawings, it should be understood that the present disclosure may be embodied in various forms and should not be limited by the embodiments set forth herein. On the contrary, these embodiments are provided so that this disclosure will be thoroughly and completely understood, and the scope of the present disclosure could be fully conveyed to those skilled in the art.

It should be noted that in the context of the description and claims, certain terms are used to refer to particular components. One skilled in the art will appreciate, various terms may be used to refer to the same component. The description and claims do not use differences in terms as a way to distinguish components, but rather differences in functions of components as criteria for distinguishing. For example, in the context of the description and claims, the terms "include" and "comprise" are open-ended, and thus should be interpreted to "include, but be not limited to". The following description is a preferred embodiment of the present disclosure, and is made for the purpose of illustrating the general principles of the present disclosure, but not for the purpose of limiting the scope of the present disclosure. The scope of the present disclosure is defined by the appended claims.

For the purpose of facilitating understanding of the embodiments of the present disclosure, the following description will be made by taking specific embodiments as examples with reference to the accompanying drawings, and the drawings are not to be construed as limiting the embodiments of the present disclosure.

In one embodiment, as shown in FIG. 1, a cyclical salinity-gradient power generating system based on phase change materials and solar photothermal conversion is provided, and includes a power generating device I, which includes: a first chamber 5 storing high concentration solution, a second chamber 7 storing low concentration solution, and an ion selective nanoporous membrane 6 arranged there between. Cations in the first chamber 5, driven by a concentration gradient, directionally migrate to the second chamber 7 through the ion selective nanoporous membrane 6, thereby forming an ionic flux. Meanwhile, a first electrode 13 is arranged in the first chamber 5 and a second electrode 11 is arranged in the second chamber 7, where electrons on the first electrode 13 migrate to the second electrode 11 via an external circuit 12 to generate electricity.

The system further includes a PCM chamber 8, which is arranged outside the first chamber 5 and the second chamber 7, and provided with phase change materials therein. The phase change materials repeatedly absorb and release heat at phase change to provide heat for the first chamber 5 and the second chamber 7, so that a directional migration rate of the cations is maintained for cyclical power generation.

In this embodiment, when sunlight irradiates first chamber 5, second chamber 7, and PCM chamber 8, temperatures of solutions in the first chamber 5 and second chamber 7 rise rapidly and reach an equilibrium. In the meantime, the phase change materials in the PCM chamber 8 absorb solar radiation, to be heated up to a melting of the materials, therefore realizing the solar energy absorption and heat storage. Due to the concentration gradient between the solutions in the first chamber 5 and second chamber 7, the cations in first chamber 5 directionally migrate to the second chamber 7 through the ion selective nanoporous membrane 6, so as to form an ionic flux, and electrons migrate from the first electrode 13 to the second electrode 11 to form electricity. In addition, due to the solar irradiation, temperatures of the solutions in the first chamber 5 and second chamber 7 rise, resulting in an improved cation activity, and an increased surface charge density of the ion selective nanoporous membrane 6 thus an improved selectivity of the cations, so that the ionic flux and the power density are increased. On the other hand, in case of lack or absence of sunlight, the temperatures of the solutions in first chamber 5 and second chamber 7 starts to drop, while the temperature of phase change materials in the PCM chamber 8 remain unchanged when it reaches the solidifying point. Hence, when the temperatures of solutions in the first chamber 5 and second chamber 7 is lower than the temperature of the phase change materials in the PCM chamber 8, the phase change materials start to release heat as a heat source, and the released heat is delivered from the PCM chamber 8 to the first chamber 5 and the second chamber 7 through the outer wall of the first chamber 5 and the second chamber 7 by means of heat conduction, so as to reduce the reduction rate of solution temperature, maintain the high temperatures of the solutions in the chambers, and enable the directional migration rate of the cations in this case to be held at the same level as in that case where the solar radiation is present, thereby still achieving the power synergy effect. When the heat stored in the phase change materials is released completely, the phase change materials restore their original state, i.e. solid state, and may experience phase change again under solar irradiation to store solar energy. The phase change materials are repeatedly subjected to phase change to store and release heat according to the solar radiation, to realize day-and-night cyclical power generation. In this embodiment, by combining solar photothermal utilization with heat storage utilization of the phase change materials, a low-cost, continuous and day-and-night cyclical power output synergy is realized.

Figure 2:
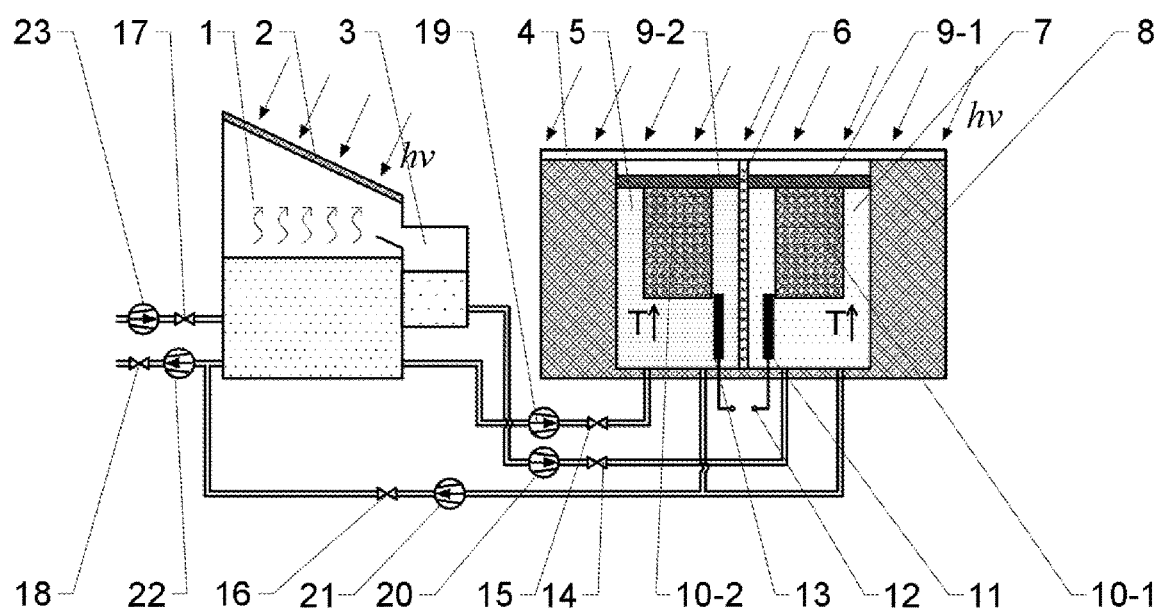
FIG. 2 is a schematic structural diagram of a power generating device according to the system shown in FIG. 1.

In another embodiment, as shown in FIG. 2, the first photothermal conversion structure 9-1 is arranged in the first chamber 5, the second photothermal conversion structure 9-2 is arranged in the second chamber 7, and the first photothermal conversion structure 9-1 and the second photothermal conversion structure 9-2 are configured to convert solar energy into heat.

In this embodiment, the surfaces of the first photothermal conversion structure 9-1 and the second photothermal conversion structure 9-2 which face the sunlight are coated with selective absorption coatings respectively, which have a high absorption rate and a low emissivity for the solar spectrum. To be specific, the first photothermal conversion structure 9-1 and the second photothermal conversion structure 9-2 can be coated with copper oxide coating or metal ceramic composite coating (including Chromium (Cr)/chromic oxide ($Cr_2O_3$), Cobalt (Co)/aluminium oxide ($Al_2O_3$), Nickel (N)/$Al_2O_3$ and the like.). Preferably, a copper sheet coated with copper oxide is adopted, in which an optical absorption coating is arranged on the top surface of the copper sheet, to absorb the solar radiation and convert it into heat.

In another embodiment, as shown in FIG. 2, a first heat conductive porous structure 10-1 is arranged in the first chamber 5 and a second heat conductive porous structure 10-2 is arranged in the second chamber 7. The first heat conductive porous structure 10-1 and the second heat conductive porous structure 10-2 are configured to conduct the heat to the first chamber 5 and the second chamber 7 respectively, to improve the absolute temperatures of the solutions.

In this embodiment, the first heat conductive porous structure 10-1 and the second heat conductive porous structure 10-2 are prepared from materials with high thermal conductivity and excellent electrical insulation, preferably silicon carbide material. The material is bonded to the bottom surface of the first photothermal conversion structure 9-1 and the second photothermal conversion structure 9-2 via a thermal conductive adhesive, and enables the thermal energy converted by the first photothermal conversion structure 9-1 and the second photothermal conversion structure 9-2 to be conducted to the first chamber 5 and the second chamber 7 respectively, thereby increasing absolute temperatures of solutions in the two chambers. Such arrangement can increase the cation activity in the solutions and the surface charge density of the ion selective nanoporous membrane 6, and in turn increases migration rate of the cations from the first chamber 5 to the second chamber 7, and thereby improving power density.

In another embodiment, a high light-transparent heat-insulation layer 4 is arranged on each of the first chamber 5, the second chamber 7 and the PCM chamber 8.

In this embodiment, on one hand, the high light-transparent heat-insulation layer 4 has a high transmissivity, to allow solar radiation to enter the first chamber 5, the second chamber 7 and, the PCM chamber 8 as much as possible for heating them up; On the other hand, the high light-transparent heat-insulation layer 4 has excellent thermal insulation performance, to prevent energy loss in the first chamber 5, the second chamber 7, and the PCM chamber 8 through convection and radiation as much as possible.

In another embodiment, the PCMs are composite phase change materials.

In this embodiment, the composite phase change material is formed with paraffin as phase change material, metal foam as a supporting skeleton and the graphene power, its derivatives or the like as an additive. The porosity of skeleton is no less than 90%, and the mass fraction of the additive is 0.1%~5%. In comparison with pure phase change material, which cannot absorb solar radiation across a whole waveband, resulting in an extremely low photothermal conversion efficiency, the composite phase change material can absorb solar radiation across the whole waveband and possess high photothermal conversion efficiency. Therefore, by using composite phase change material, temperature uniformity and heat storage capacity of the solutions in the first chamber 5 and the second chamber 7 can be enhanced with achieving photothermal effect, thus improving the solar photothermal conversion efficiency.

In addition, it should be noted that the phase transition temperature of the composite phase change material is slightly higher than the equilibrium temperature which the solutions in the first chamber 5 and second chamber 7 reach after being subjected to solar irradiation, to ensure that the heat released by the phase change material are enough to maintain the temperatures of the solutions at the highest possible temperature.

In another embodiment, the system also includes a solution supplying device II. The solution supplying device II includes a first solution storage tank 1 configured for providing high concentration solution to the first chamber 5, and a second solution storage tank 3 configured for providing low concentration solution to the second chamber 7.

In this embodiment, top surface of the first solution storage tank 1 is designed to be inclined, and has an optical collector 2 provided thereon. When solar radiation is concentrated by the optical collector 2 to illuminate the first solution storage chamber 1, the stored seawater begins to evaporate to generate steam, which ascends up to the top surface of the first solution storage tank 1 and is condensed here. Condensed water flows into the second solution storage tank 3 along a channel on the top surface of the first solution storage tank 1, resulting in a concentration gradient between the solution in the first solution storage tank 1 and the solution in the second solution storage tank 3. In addition, an inclined baffle is provided between the first solution storage tank 1 and the second solution storage tank 3, to prevent the condensed water dropped into the second solution storage tank 3 from flowing backward to the first solution storage tank 1.

In addition, the first solution storage tank 1 is connected to the first chamber 5 through a first inlet valve 15, a first inlet pump 19, and a pipeline, and further connected to a main outlet valve 18 and a main outlet pump 22 through an outlet valve 16, an outlet pump 21, and a pipeline. The second solution storage chamber 3 is connected to the second chamber 7 through a second inlet valve 14, a second inlet pump 20, and a pipeline, and further connected to the main outlet valve 18 and the main outlet pump 22 through an outlet valve 16, an outlet pump 21, and a pipeline. Through the above valves, pumps and pipelines, the seawater stored in the first solution storage chamber 1 can be transported to the first chamber 5, and the fresh water stored in the second solution storage chamber 3 can be transported to the second chamber 7 for power generation.

In another embodiment, each of the first electrode 13 and the second electrode 11 is an Argentum (Ag)/Silver chloride (AgCl) electrode.

In this embodiment, the reason of choosing Ag/AgCl electrode lies in its stable electrochemical properties, easy preparation and low cost.

The Ag/AgCl electrode is prepared by using an electroplating method. To be specific, smooth silver wire is placed into Potassium chloride (KCl) solution with a concentration of 1M, as an anode, and an inert platinum electrode is configured as a cathode. Then, the circuit is applied with a constant current of 1-4 mA for 0.5-4 hours.

In another embodiment, the system further includes a power output device III, which includes a storage battery and power transmission components.

In this embodiment, the storage battery is connected to the first chamber 5 and the second chamber 7 through an external circuit. The electric power generated by means of the concentration gradient between the solution in the first chamber 5 and the solution in the second chamber 7 is transmitted to the storage battery for storage through an output circuit. A part of electric power stored in the storage battery can be used to supply power for the main inlet pump 23, the main outlet pump 22, the first inlet pump 19, the second inlet pump 20, and the outlet pump 21, for operating intermittently. The rest of electric power is used as system output and implement external power supply.

Figure 3:
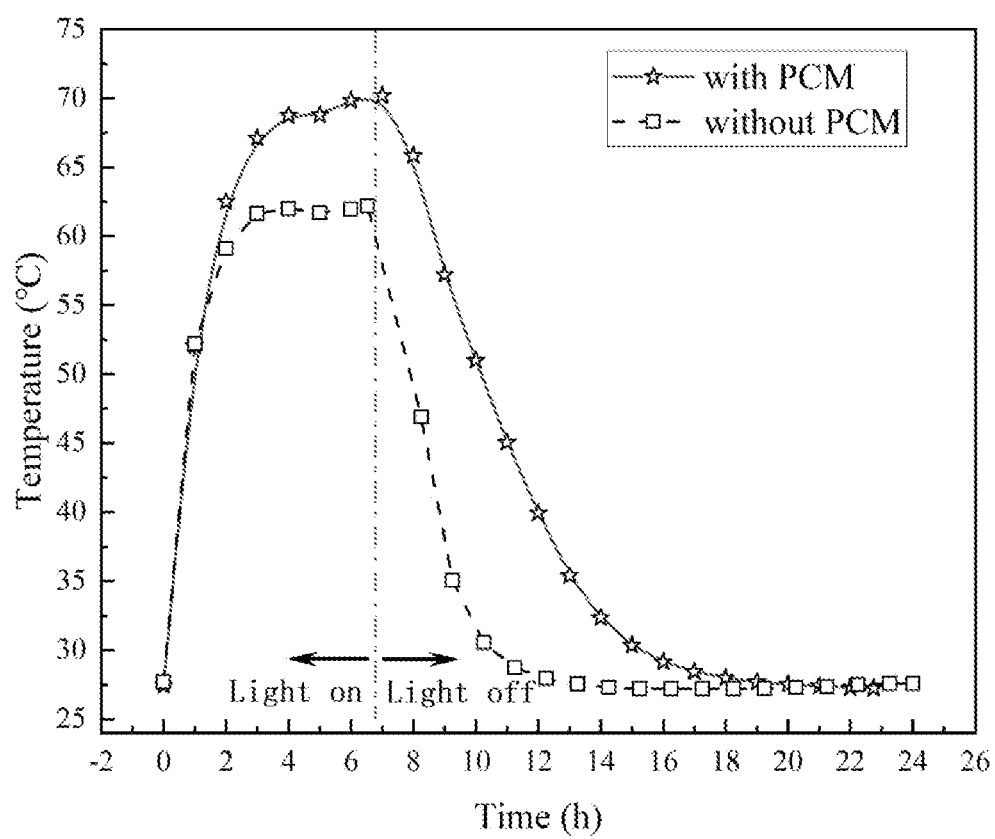
FIG. 3 is a schematic diagram of an effect of a heat preservation test performed on phase change materials according to the system shown in FIG. 1.

FIG. 3 is a schematic diagram of heat preservation effect of the first chamber 5 and the second chamber 7, with and without the phase change materials. As shown in FIG. 3, in case of solar irradiation, largest temperature of the first chamber 5 and the second chamber 7 with phase change materials provided is higher than that of the first chamber 5 and the second chamber 7 without phase change materials. In case of no sunlight, descent rate of temperatures of solutions in the first chamber 5 and second chamber 7 with phase change materials is obviously lower, in combination with absence of phase change materials.

Figure 4:
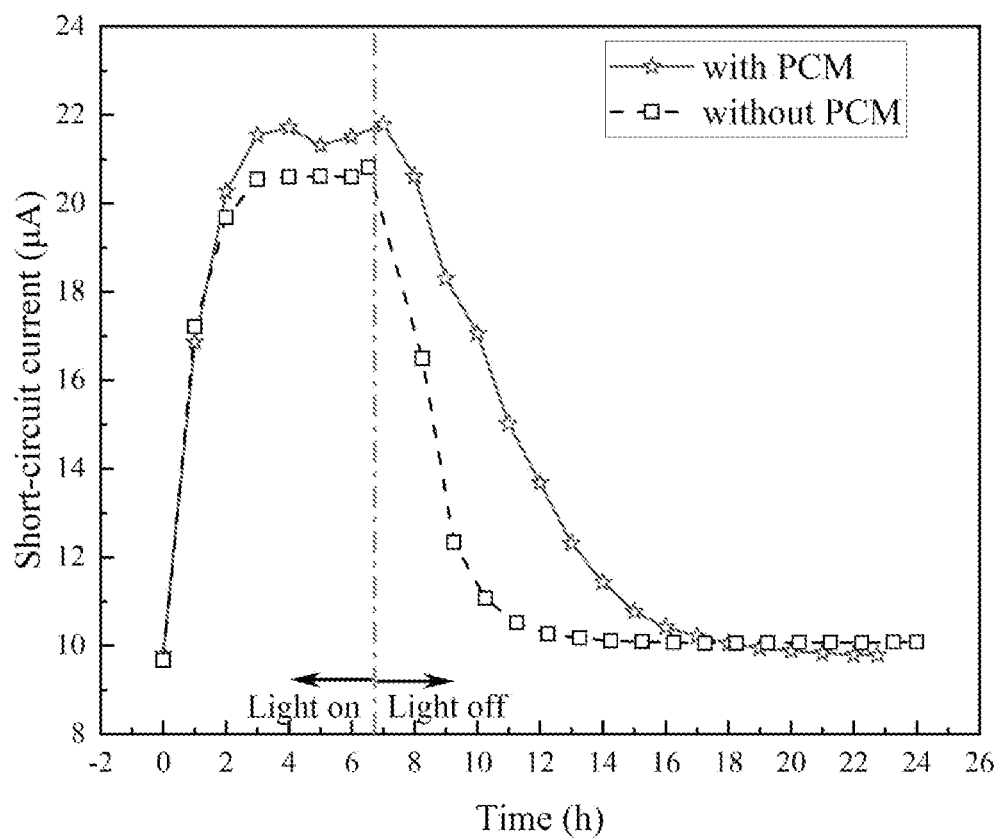
FIG. 4 is a schematic diagram of a comparison between a short circuit current with phase change materials and a short circuit current without phase change materials according to the system shown in FIG. 1.

FIG. 4 is a schematic diagram of the comparison of a short circuit current between the first chamber 5 and the second chamber 7, with and without phase change materials. As shown in FIG. 4, in case of solar irradiation, the maximum value of the short circuit current between the first chamber 5 and the second chamber 7, with phase change materials provided, is larger than that of the short circuit current between the first chamber 5 and the second chamber 7, without phase change materials provided. In case of no sunlight, descent rate of the short circuit current between the first chamber 5 and the second chamber 7, with phase change materials provide, is lower than that of the short circuit current between the first chamber 5 and the second chamber 7, without phase change materials.

Combining temperature curves in FIG. 3 and short circuit current curves in FIG. 4, it is proved that increasing solution temperature can improve power density. In addition, phase change materials can be used to maintain the power generation synergy effect by maintaining solution temperature, so that the system can implement day-and-night cyclical power generation.

The foregoing description of specific embodiment has been provided for the purpose of exemplification and illustration, rather than limitation of the present disclosure. Any partial modification or alteration within the scope of the technology disclosed in the present disclosure by a technical person skilled in the art shall be covered by the present disclosure.

What is claimed is:

1. A cyclical salinity-gradient power generating system based on phase change materials and solar photothermal conversion, comprising:

a power generating device comprising a first chamber storing high concentration solution, a second chamber storing low concentration solution, and an ion selective nanoporous membrane arranged between the first chamber and the second chamber, wherein cations in the first chamber are driven by a concentration gradient to directionally migrate into the second chamber through the ion selective nanoporous membrane, to form an ionic flux; a first electrode is arranged in the first chamber and a second electrode is arranged in the second chamber, electrons on the first electrode migrate from the first electrode to the second electrode via an external circuit;

a phase change material (PCM) chamber arranged outside the first chamber and the second chamber and provided with phase change materials therein, wherein the phase change materials repeatedly undergo phase changing accompanied with heat storage and release, to provide heat for the first chamber and the second chamber, thereby maintaining a directional migration rate of the cations and to implement cyclical power generation.

2. The cyclical salinity-gradient power generating system as claimed in claim 1, wherein, a first photothermal conversion structure is arranged in the first chamber and a second photothermal conversion structure is arranged in the second chamber, and the first photothermal conversion structure and the second photothermal conversion structure are configured to convert solar energy into heat.

3. The cyclical salinity-gradient power generating system as claimed in claim 2, wherein, a first heat conductive porous structure is arranged in the first chamber and a second heat conductive porous structure is arranged in the second chamber, the first heat conductive porous structure is configured to conduct the heat to the first chamber, and the second heat conductive porous structure is configured to conduct the heat to the second chamber, to improve absolute temperatures of the high concentration solution and the low concentration solution.

4. A method performed by the cyclical salinity-gradient power generating system based on phase change materials and solar photothermal conversion as claimed in claim 3, comprising following steps:
- S1: driving, by the concentration gradient between the high concentration solution in the first chamber and the low concentration solution in the second chamber, cations in the first chamber to directionally migrate into the second chamber through the ion selective nanoporous membrane, to form the ionic flux, and migrating electrons from the first electrode to the second electrode via the external circuit to form currents and in turn generate power;
- S2: converting, by the first photothermal conversion structure and second photothermal conversion structure, solar energy into heat, and conducting, by the first photothermal conversion structure and the second photothermal conversion structure, the heat to the first chamber and the second chamber respectively, to improve absolute temperatures of the high concentration solution and the low concentration solution, thus increasing the directional migration rate of the cations;
- S3: causing phase change materials in the PCM chamber to undergo a phase changing to store the heat under an action of solar energy, and undergo another phase changing to release the heat, to maintain the directional migration rate of the cations in case of a lack of solar energy.

5. The cyclical salinity-gradient power generating system as claimed in claim 1, wherein, a high transmittance heat-insulation layer is arranged on each of the first chamber, the second chamber and the PCM chamber.

6. The cyclical salinity-gradient power generating system as claimed in claim 1, wherein, the PCMs are composite phase change materials.

7. The cyclical salinity-gradient power generating system as claimed in claim 1, further comprising a solution supplying device, which comprises a first solution storage tank providing the high concentration solution to the first chamber and a second solution storage tank providing the low concentration solution to the second chamber.

8. The cyclical salinity-gradient power generating system as claimed in claim 7, wherein, an optical collector is arranged on the first solution storage tank.

9. The cyclical salinity-gradient power generating system as claimed in claim 1, wherein, each of the first electrode and the second electrode is an Argentum (Ag)/Silver chloride (AgCl) electrode.

10. The cyclical salinity-gradient power generating system as claimed in claim 1, further comprising a power output device, which comprises a storage battery and power transmission components.

\* \* \* \* \*